United States Patent [19]

Schmidt et al.

[11] Patent Number: 4,821,256

[45] Date of Patent: Apr. 11, 1989

[54] METHOD FOR MONITORING INFORMATION TRANSMISSION IN CONNECTED THROUGH FOUR-WIRE CONNECTING PATHS, MORE PARTICULARLY SEMIPERMANENTLY CONNECTED THROUGH CONNECTING PATHS IN DIGITAL TIME MULTIPLEX EXCHANGES

[75] Inventors: Lothar Schmidt, Fuerstenfeldbruck; Gerhard Schaich; Wolfram Ernst, both of Munich, all of Fed. Rep. of Germany

[73] Assignee: Siemens Aktiengesellschaft, Berlin and Munich, Fed. Rep. of Germany

[21] Appl. No.: 67,065

[22] Filed: Jun. 25, 1987

[30] Foreign Application Priority Data

Jun. 27, 1986 [DE] Fed. Rep. of Germany ....... 3621531

[51] Int. Cl.$^4$ .................. H04L 11/08; H04Q 1/20; H04Q 11/04
[52] U.S. Cl. .................................................. 370/13
[58] Field of Search ................ 370/13, 14, 17; 371/49

[56] References Cited

U.S. PATENT DOCUMENTS

| | | | |
|---|---|---|---|
| 4,149,038 | 4/1979 | Pitroda et al. | 370/14 |
| 4,345,324 | 8/1982 | Smitt | 370/13 |
| 4,393,490 | 7/1983 | Culley | 370/13 |
| 4,575,841 | 3/1986 | Fagerstedt et al. | 370/14 |

FOREIGN PATENT DOCUMENTS 57-385  5/1981  Japan .................. 370/13

Primary Examiner—Douglas W. Olms
Assistant Examiner—Melvin Marcelo
Attorney, Agent, or Firm—Adel A. Ahmed

[57] ABSTRACT

The switching network is tested by comparison of bit streams coming from the double part switching network parts; other parts of the exchange are tested by parity checking. Evaluation takes place at a central location; when a parity error is found in the transmission in a direction of transmission, the parity bit generated for transmission in the other direction of transmission is falsified.

12 Claims, 3 Drawing Sheets

METHOD FOR MONITORING INFORMATION TRANSMISSION IN CONNECTED THROUGH FOUR-WIRE CONNECTING PATHS, MORE PARTICULARLY SEMIPERMANENTLY CONNECTED THROUGH CONNECTING PATHS IN DIGITAL TIME MULTIPLEX EXCHANGES

This invention concerns a method for monitoring information transmission in connected-through four-wire connecting paths, more particularly, semipermanently connected through connecting paths in digital time multiplex exchanges, wherein line/terminal trunk groups comprising a plurality of units and a doubled or double part switching network in which each connection is carried twice in Parallel form peripheral function blocks which are responsive to a coordinating processor.

Concerning the supervision of completed connecting paths in time multiplex exchanges structured in this manner, only the testing of the through connection of connecting paths in relation to the connection-set-up has been undertaken.

Nevertheless, the need exists for monitoring also during the existence of the connection, particularly in view of semipermanently connected-through connecting paths, that is, dedicated circuits which are established for long duration for data transmission.

In the prior art, failures of such dedicated circuits have been recognized only through monitoring of terminal equipment and made known by corresponding fault signalling to terminal equipment operators. Since dedicated lines usually run through several exchanges, the location of failures is very time consuming with this type of monitoring.

Accordingly, a task of the present invention is to provide a method for monitoring of information transmission on connected-through connecting paths which is adapted to the conditions of the structuring of the time multiplex exchange referred to above.

In accordance with an aspect of the invention, this task is solved by a method characterized in that the channel information streams reaching a line/trunk group from both switching network portions and to be further transmitted thereover in a first part in a transmitting direction of transmission are concurrently compared with one another bit for bit in a unit on the input side thereof in the transmitting direction of transmission; in that the channel information streams reaching this line/trunk group in a receiving direction of transmission from the transmission circuit are provided with a parity bit in a unit thereof on the input side in this direction of transmission and after traversing through all units of said unit wherein the comparison of the information streams from the switching network takes place are subjected to a parity check; in that these channel information streams are also provided with a parity bit in this unit of the line/trunk group and in so far as they are to be transmitted to the PCM path, are subjected to a parity check in the unit of the line/trunk group on the input side in said receiving direction of transmission; and in that, in so far as this parity check signals the presence of an error, the parity bit with which the PCM channel information streams arriving by way of the transmission path are provided is inverted so that the corresponding parity check in the last unit in this direction of transmission also provides an error signal.

A feature of the invention thus comprises in part the concurrent supervision individual to each channel and furthermore that corresponding differing supervision principles apply to the differing failure areas of the postulated time multiplex exchange and that measures are provided through which the detection of failures can occur at a central location of the exchange independently of the location of the failure.

In a further embodiment of the inventive method by which, with the proviso of a special structure of the line/trunk groups, the supervision control addresses relating to the connection can also be included in the monitoring relating to the connection.

Another embodiment of the invention concerns the processing of error signals which only result in a failure signal when the error rate per unit time has exceeded a predetermined limit value.

Error localizing measures for errors occurring in line/trunk groups are provided in further embodiments of the invention.

The invention will next be described in greater detail by way of an exemplary embodiment in conjunction with the drawings in which.

Figure 1:
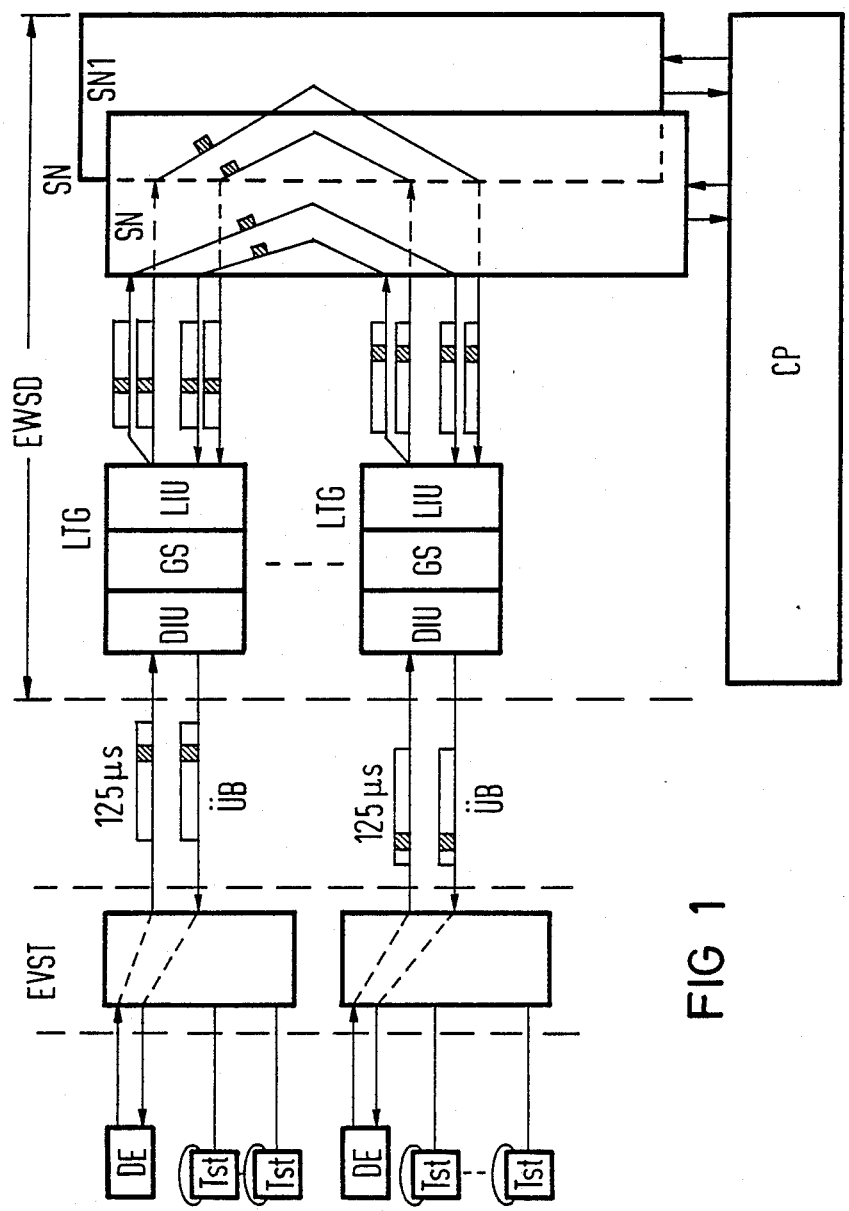
FIG. 1 shows a telecommunication system comprising a plurality of time multiplex exchanges for illustrating a typical connection path for dedicated circuits.

The telecommunication network shown in FIG. 1 has two terminal exchanges EVST, to which are coupled a plurality of terminal equipments in the form of telephone stations Tst. Furthermore, it has a further time multiplex exchange EWSD which is in communication with the terminal exchanges by way of a transmission circuit US and in an association to be explained, a dedicated circuit operates as a tandem exchange. This further time multiplex exchange EWSD is formed of peripheral functional blocks in the form of line/trunk groups LTG and a doubled switching network SN which are subject to control by a coordinating processor CP, as is also the terminal exchange EVST. The line/trunk groups LTG themselves comprise a plurality of units of which only those are shown over which information is to be transmitted between terminal equipment and those involving an interface unit LIU to the switching network, a group coupler GS and an interface unit to the transmission circuit US. In the case of a dedicated circuit between terminal equipment DE, which is here considered to be preferred, the connection path is four-wire throughout, that is, also on the subscriber termination line to the terminal exchange EVST, in the terminal exchange, in the transmission circuit UB and in the tandem exchange EWSD. Telephone stations Tst are in contrast coupled to the terminal exchange EVST by two-wire lines.

As FIG. 1 further shows, a connection from a line/trunk group LTG is by way of switching network half SNO as well as by way of switching network half SNl.

Figure 2:
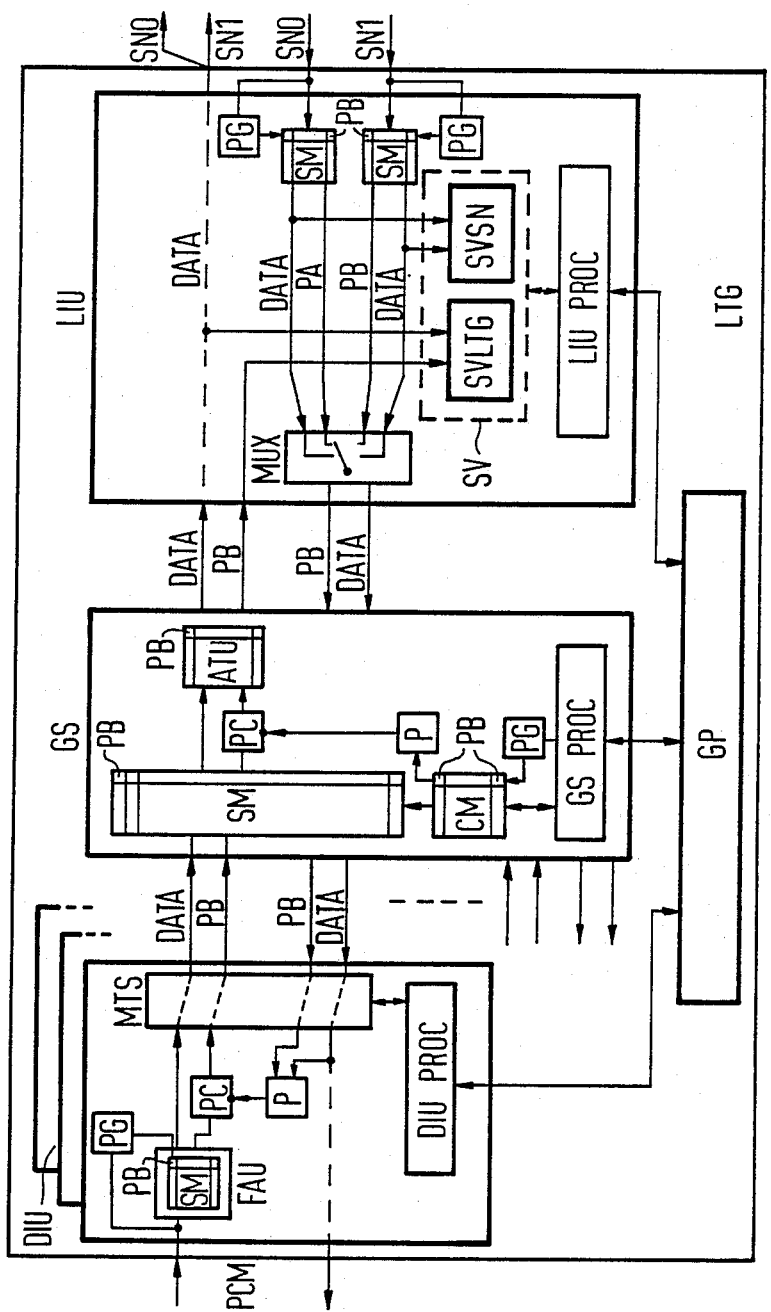
FIG. 2 shows a representation in greater detail of a line/trunk group of a time multiplex exchange of the type postulated.

FIG. 2 shows a line/trunk group LTG in closer detail.

As already indicated, such a line/trunk group comprises a plurality of units, namely interfaces DIU and LIU as well as a group coupler GS. These units are under the control of a group processor GP which in turn is influenced by coordination processor CP, already mentioned, such that the corresponding control paths are by way of switching network SN. (See also FIG. 1).

The mentioned units of the line/trunk groups in turn comprise a plurality of components whose failure or partial failure leads to interruption of at least individual connections running thereover. In relation to interface unit DIU, an arrangement FAU for compensating phase is noted, which comprises a speech memory SM; in group switch GS these comprise switching storage, also comprising a speech memory SM and its appurtenant control memory CM wherein are stored control addresses for the speech memory as well as an attenuating arrangement ATU. In interface unit LIU these are also a speech memory serving for time slot matching, i.e., synchronizing channel information to an internal clock.

The central part of the supervisory circuit for carrying out supervision in accordance with the invention is a component of interface unit LIU and is indicated as SV. It comprises in turn two functional blocks SVSN and SVLTG which are responsible for monitoring switching network SN or, as the case may be, line/terminal group LTG, corresponding to the concept at the basis of the invention.

The implementation of the method according to the invention will next be more closely explained.

In accordance with a first partial feature of the method according to the invention, both channel information streams reaching interface LIU from both switching network halves, and which are indicated in the FIGURE as DATA are compared bit for bit for correspondence before being further coupled by way of group coupler GS and the interface unit DIU to the transmission circuit UB. Of the two data streams coming from switching network SN, only one is selectively transmitted depending on the switching position of multiplexer MUX, which is also a component of interface unit LIU.

In the implementation of the portion of the supervising method in accordance with the invention serving to monitor the line/trunk groups, the channel information streams reaching interface unit DIU from the transmission circuit PCMS in the receiving direction of transmission are provided with a parity bit by a parity bit generator PG, which parity bit is also temporarily stored in speech memory SM of this interface unit and then transmitted to interface unit LIU together with channel information streams DATA by way of group coupler GS, whereupon all units of line/trunk group LTG in the connection path in one direction of transmission are traversed. A parity check is there undertaken through the supervisory arrangement SVLTG previously mentioned which provides an indication by way of the connection path through line/trunk group LTG in the direction of transmission from the input connection for the transmission path PCMS to the output connection on switching network side.

The channel information streams referred to coming from the switching network halves SN0 and SN1 which are to be transmitted in opposite directions of transmission are also provided with a parity bit at the input of the bit location unit LIU by a parity generator PG, which bit is stored temporarily together with these information streams in the speech memory therein. Depending on the switching position of multiplexer MUX channel information stream DATA provided with a parity bit coming from one or the other switching network half is transmitted by way of group coupler GS to interface unit DIU, whereupon all of the portions of line/trunk group LTG in the connection path are traversed in this oppositely directed transmission direction. A parity check is also undertaken there using parity checker P.

Should this parity check indicate the presence of an error, the parity bit which was provided the information streams coming from the transmission circuit US is inverted by an arrangement PC, in contradiction of the actual parity. After this channel information together with the inverted parity bit has passed through units GS and LIU, the presence of an error is accordingly detected by supervising arrangement SVLTG.

The control addresses stored in control memory CM of group coupler GS for switching storage SM also provided with a parity bit and are subjected to a parity check at each cyclical readout. When an error is thereby detected, the parity bit originally formed from PCM channel information coming from the transmission circuit US is inverted in accordance with the foregoing procedure, such that in this case also, the parity check performed by way of supervising arrangement SVLTG in interface unit LIU indicates the presence of an error.

The channel errors for the switching network and for the line/trunk group centrally detected in this manner in package LIU are separately summed for both regions in error counters individual to each channel. These counter counts are interrogated at predetermined time intervals and communicated to group processor GP, where a comparison with a predetermined quality threshold is made again. When such a quality threshold is exceeded, a fault signal is communicated to coordination processor CP.

In the event the error is in the switching network and concerns a dedicated circuit, the coordination processor thereupon initiates a connection set-up of this dedicated circuit by an alternative path.

In the event of a fault signal, a fault localization is next undertaken in the following manner and thereupon an error signal together with the result of the fault localization is transmitted to the coordination processor.

Figure 3:
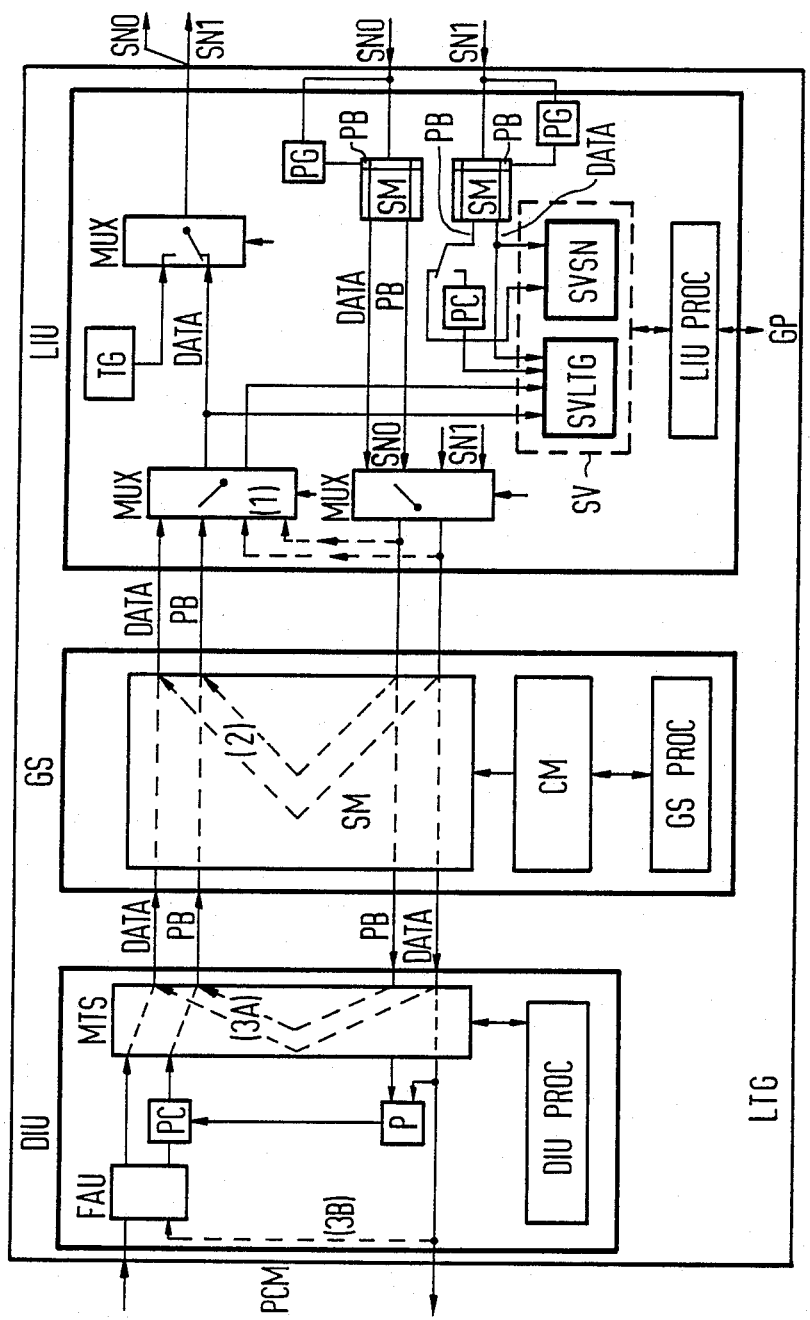
FIG. 3 the same line/trunk group with the units and test connections needed for error localization.

If the fault signal concerns switching network SN, testing is then performed for the purpose of localizing the error only as to whether the monitoring arrangement SVSN is itself the source of the error in that, as indicated in FIG. 3, the channel information to be transmitted from unit LU to group coupler GS is subject to a parity check by supervising unit SVSN before and following inversion of the appurtenant parity bit before traversing further units of the line/trunk group, such that a good/bad indication is obtained in relation to this supervising circuit.

In the event of a fault indication relating to line/trunk group LTG, a check of the corresponding monitoring arrangement SVLTG is then undertaken in the same manner, and thereafter, in order to further localize the error, and as is likewise apparent from FIG. 3, test loops are set up successively (1) in package LIU, (2) in group coupler GS and (3a) and (3b) in interface unit DIU. A test combination of bits generated by an arrangement TG belonging to package LIU is transmitted through these test loops and transmitted over switching network SN and thereafter again to package LIU and therein provided with a parity bit. The evaluation of the test combination of bits returning following passage through the respective test loop by the supervising arrangement takes place in the manner described.

We claim:

1. A method for monitoring information transmission in connected-through four-wire connecting paths, more particularly semipermanently connected-through connecting paths in digital time multiplex exchanges wherein line/trunk groups comprising a plurality of units and a double part switching network through which network each connection is formed twice in parallel form peripheral functional blocks under control of a coordination processor, said method comprising:

comparing bit for bit with one another first and second channel information streams coming from respective parts of said double part network to a line/trunk group and, with respect to one of said first and second channel information streams, to be further transmitted by way of said line/trunk group in a transmitting direction of transmission to a transmission circuit in a unit of said line/trunk group on the input side of said direction of transmission;

providing a parity bit to channel information streams coming in a receiving direction of transmission from said transmission circuit to said line/trunk group in a unit of said line/trunk group on the input side of said direction of transmission and subjecting said channel information streams coming in said receiving direction to a parity check after having traversed all units, including a last unit in a receiving direction of transmission wherein said comparing of said channel information streams coming from said switching network occurs;

providing a parity bit also to said channel information streams coming from said double part network in said last-named unit of said line/trunk group and subjecting said channel information streams, insofar as being transmitted to said transmission circuit, to a parity check in said unit of said line/trunk group on the input side of said receiving direction of transmission; and insofar as said parity check indicates the presence of an error, inverting said parity bit provided said channel information streams coming from said transmission circuit in contradiction to actual parity such that the corresponding parity check in the last unit in said direction of transmission also indicates an error.

2. A method according to claim 1 applicable to a time multiplex exchange, wherein line/trunk groups include a coupling stage as a package subject to control by control addresses stored in a control memory and cyclically non-destructively read out, comprising:

providing said control addresses stored in said control memory a parity bit and always subjecting said control addresses to a parity check following readout; and in the event of a detected error, inverting a parity bit provided channel information streams transmitted by a last unit in a receiving direction of transmission, in contradiction to actual parity in said channel information streams.

3. A method according to claim 1, comprising:
counting the error signal from each of both types of monitoring and comparing the sum thereof with a predetermined quality threshold, a fault signal being produced when said threshold is exceeded.

4. A method according to claim 2, comprising:
counting the error signal from each of both types of monitoring and comparing the sum thereof with a predetermined quality threshold, a fault signal being produced when said threshold is exceeded.

5. A method according to claim 3, comprising:
in the event of a fault indication, checking a corresponding monitoring arrangement, by a process including subjecting information coming from said switching network to a parity check by said monitoring arrangement before being transmitted through further units of said line/trunk group, before and after inversion of the appurtenant parity bit.

6. A method according to claim 4, comprising:
in the event of a fault indication, checking a corresponding monitoring arrangement, by a process including subjecting information coming from said switching network to a parity check by said monitoring arrangement before being transmitted through further units of said line/trunk group, before and after inversion of the appurtenant parity bit.

7. A method according to claim 3, comprising:
in the event of a fault signal relating to a line/trunk group outputted by a respective supervision unit, checking the respective supervision unit for further determining fault location, by a process including subjecting information coming from said switching network to a parity check before being transmitted through further units of a line/trunk group before and after inversion of the appurtenant parity bit; and successively closing test loops in packages of said line/trunk group, in each case transmitting therethrough a test bit combination provided with a parity bit and thereafter subjecting said test bit combination to a parity test by said supervision unit.

8. A method according to claim 4, comprising:
in the event of a fault signal relating to a line/trunk group, checking the respective supervision unit for further determining fault location, by the process including subjecting information coming from said switching network to a parity check before being transmitted through further units of a line/trunk group before and after inversion of the appurtenant parity bit; and successively closing test loops in packages of said line/trunk group, in each case transmitting therethrough a test bit combination provided with a parity bit and subjecting said test bit combination to a parity test by said supervision unit.

9. A method according to claim 5, comprising:
in the event of a fault signal relating to a line/trunk group, checking the respective supervision unit for further determining fault location, by the process including subjecting information coming from said switching network to a parity check before being transmitted through further units of a line/trunk group before and after inversion of the appurtenant parity bit; and successively closing test loops in packages of said line/trunk group, in each case transmitting therethrough a test bit combination provided with a parity bit and thereafter subjecting said test bit combination to a parity test by said supervision unit.

10. A method according to claim 6, comprising:
in the event of a fault signal relating to a line/trunk group, checking the respective supervision unit for further determining fault location, by the process including subjecting information coming from said switching network to a parity check before being transmitted through further units of a line/trunk group before and after inversion of the appurtenant parity bit; and successively closing test loops in packages of said line/trunk group, transmitting therethrough in each case a test bit combination provided with a parity bit and thereafter subjecting said test bit combination to a parity test by said supervision unit.

11. A method according to claim 3, comprising:
in the event of a fault signal concerning a semipermanent circuit relating to said switching network,
releasing said semipermanent circuit and newly setting up said semipermanent circuit by way of another circuit.

12. A method according to claim 4, comprising:
in the event of a fault signal concerning a semipermanent circuit relating to said switching network,
releasing said semipermanent circuit and newly setting up said semipermanent circuit by way of another circuit.

* * * * *